(12) United States Patent
Doedens et al.

(10) Patent No.: US 12,555,217 B2
(45) Date of Patent: Feb. 17, 2026

(54) SYSTEM AND METHOD FOR POSITIONING OF PRE-MOLDED ACCESSORY COMPONENT FOR A HIGH VOLTAGE CABLE

(71) Applicant: NEXANS, Courbevoie (FR)

(72) Inventors: Espen Doedens, Halden (NO); Nils-Bertil Frisk, Stromstad (SE)

(73) Assignee: NEXANS, Courbevoie (FR)

( * ) Notice: Subject to any disclaimer, the term of this patent is extended or adjusted under 35 U.S.C. 154(b) by 337 days.

(21) Appl. No.: 18/139,081

(22) Filed: Apr. 25, 2023

(65) Prior Publication Data

US 2023/0386009 A1 Nov. 30, 2023

(30) Foreign Application Priority Data

Apr. 26, 2022 (EP) .................................... 22305616

(51) Int. Cl.
*G06T 7/00* (2017.01)
*G01N 21/952* (2006.01)

(52) U.S. Cl.
CPC ......... *G06T 7/0004* (2013.01); *G01N 21/952* (2013.01); *G06T 2207/10028* (2013.01)

(58) Field of Classification Search
CPC ................... G06T 7/00; G06T 7/0004; G06T 2207/10028; G01N 21/952; H02G 1/14; H02G 1/12; H01R 43/28
See application file for complete search history.

(56) References Cited

U.S. PATENT DOCUMENTS

| 9,129,355 | B1* | 9/2015 | Harvey | G06V 10/42 |
| 11,561,251 | B2* | 1/2023 | Schwartz | G06Q 10/06311 |
| 2019/0305499 | A1 | 10/2019 | Gustafsson | |
| 2022/0244303 | A1* | 8/2022 | Birchbauer | G01R 31/088 |

FOREIGN PATENT DOCUMENTS

| CN | 112 017 233 | 12/2020 |
| EP | 3 901 571 | 10/2021 |

OTHER PUBLICATIONS

Doedens Espen et al: "Space Charge Accumulation at Material Interfaces in HVDC Cable Insulation Part I—Experimental Study and Charge Injection Hypothesis", Energies, Apr. 17, 2020.
European Search Report dated Oct. 14, 2022.

* cited by examiner

*Primary Examiner* — Stephen R Koziol
(74) *Attorney, Agent, or Firm* — CANTOR COLBURN LLP

(57) ABSTRACT

A method and system for performing quality checks and positioning of a high voltage accessory component on a high voltage cable during installations and re-using the data from the positioning at a later stage during the lifetime of the cable is described. A 3-dimensional scanner is employed to scan the surface of the high voltage cable and the accessory component to be placed on the cable. The data from the scanner is converted into 3D coordinates and employed by a processor to check for deviations in the quality of the accessory components. The processor then computes and determines the positioning of the accessory component on the high voltage cable. A method for performing quality checks for the subcomponents of the accessory components before positioning of the accessory component during installations is also described.

14 Claims, 6 Drawing Sheets

SYSTEM AND METHOD FOR POSITIONING OF PRE-MOLDED ACCESSORY COMPONENT FOR A HIGH VOLTAGE CABLE

RELATED APPLICATION

This application claims the benefit of priority from European Patent Application No. 22 305 616.9, filed on Apr. 26, 2022, the entirety of which is incorporated by reference.

FIELD OF THE INVENTION

The invention relates to high voltage cables. In particular, to performing quality checks and positioning of accessories for high voltage cables such as high voltage cable joints, pre-molded components and terminations during installations.

BACKGROUND

A high voltage cable is used for electric power transmission at high voltages in the ranges of 1 kV and above. The high voltage cables are used in numerous applications such as underground installations, offshore applications, sub-sea applications, overhead installations to name a few. In such applications, once the high voltage cables are installed maintaining their integrity may be a critical aspect. For example, when high voltage cables are installed in harsh environment applications, there is an inherent need to protect the electrical connections from the environment.

For high voltage cable accessory installations, such as cable joints and terminals, the outer layers are removed from an end of the cable, by cutting, sanding or any other method by an operator, to make a cable end 1. FIG. 1 shows an exemplary high voltage cable end 1. The outer sheath 9, the lead sheath 8, swelling tapes 7 and the outer semiconducting screen 6 have been removed, leaving the conductor 2, the inner semiconducting screen 3 and the insulation 4. The surface 5 of the insulation 4 is inspected to ensure that there are no irregularities, before a high voltage cable accessory component, such as a rubber joint, is slipped over it.

Further, electrical stress concentrations in cable terminations can cause degradation of the cable insulations. This problem is addressed by providing cable terminations and joints employed in high voltage cables with stress control elements such as stress cone, high-K layer, or any other accessories commonly known in the industry. However, there are several challenges during installation of accessory components on high voltage cables such as the stress control elements or high voltage cable joints or terminations, such as improper placement or positioning of the accessory components can render them ineffective or less effective.

Installations need to be carried out by skilled professionals in the field and their understanding of the cable's terminations, joints, dimensional tolerances they have to work with have to be thorough and thus there is very little room for error.

In present scenarios, control and placement of accessories for high voltage cables (e.g., terminations and joints) is done by employing several manual procedures. Ink markers are employed for marking the exact position and dimensions of the joints, terminations, stress handling components and accessories. Further, the skilled operator may employ measuring tape to measure and achieve the position that is provided in the operator report. There are several drawbacks associated with manual measurement procedures, firstly such measurements are prone to human errors.

Secondly, there is no ability to control the accessory component and its positioning after several years from the installation due to changes experienced by the accessory such as changes in dimensions, change in position during the load cycles experienced by the cable during service or testing. Additional, challenges may arise due to the material of the accessory that may experience deformations when expanded over the cable length, expansion, shrinkage etc. These can lead to serious problems such as electrical breakdown of the assembly.

US20160300645A1 describes positioning device for cable accessories and methods, assemblies for the cable. In this application, a protective cover with positioning device is used for high voltage cables. A pre-expanded cover unit for electrical cable insulation which includes cold-shrinkable, tubular, removable holdout is employed along with a positioning device to be placed over the electrical cable. Such methods are expensive, require special training for the skilled operators, use extra time and effort and do not ensure optimal protection of the cables.

Another important aspect in the medium and/or high voltage industry is quality control of the accessory components. The electric stresses experienced by the accessory components may be oriented tangentially, perpendicularly, or a combination thereof to the surface of the accessory components. Any defects, protrusions, irregularities, on the surface may hamper the long-term electrical performance of the component, by means of localized field enhancement which can result in a flashover from/to the adjacent surfaces or along the surface of the component. The quality control (QC) of such surfaces is thus essential. The surface quality control of the components is a costly and time staking process. Further, for many of the components there is lacking a fast, accurate, cost efficient quality control procedure that ensures that surface finish and geometry is according to the specifications.

Traditionally, quality control in the high voltage industry involves manual inspection performed by the human eye, however this is not a fool-proof solution. Other solutions may include electrical testing requiring high voltage energization of the component, such as PD testing, DC withstand test, AC withstand test. These tests ensure quality testing by their ability to screen any sort of manufacturing defect or deviations.

EP3901571 which is a previous application from the applicant discusses method for determining surface quality of a high voltage cable end. The method employs non-contact surface scanner moving about the cable end to measure distance to the surface over the area of the cable, creating 3D surface geometry measurement of the surface of the cable end and comparing by means of a processor the surface geometry acceptance threshold for the quality of the surface of the high voltage cable end.

The above mentioned techniques struggle with assessing macro-geometric deviations on the accessory components, cuts or defects on parts that are not submitted to high field stress during quality checks, geometry of crucial regions may still pass the test in spite of deviating from their original design. Further, there is no possibility to perform quality check on various parts/components that are placed at the final stages onto the high voltage components.

The above-mentioned applications do not address methods for positioning of accessories or subcomponents on-site. Also, there are no mechanisms to track and place geometry of each installed accessory during the lifetime of the cable system such that the tracked measurements can be stored and re-used at a later stage.

SUMMARY

An object of the invention is to provide a method for positioning of an accessory component on high voltage (HV) cable during installations. The method further includes steps of: determining the geometry of the high voltage accessory component by employing a 3-dimensional scanner, employing a point data cloud (x, y, z) coordinates that converts the scanned data geometry into 3-dimensional coordinates, processing the obtained coordinates by a processor to perform the steps of:
  a. identifying points of interest of the inner material of the high voltage cable,
  b. calculating positioning points of the accessory components on the high voltage cable by comparing with the points of interest, and
  c. positioning the accessory component on the high voltage cable at the calculated positioning points.

In an embodiment of the invention, geometry of the high voltage accessory component is determined by scanning before positioning over the cable and/or after positioning of a cable end in its final position.

In an embodiment of the invention, identifying points of interest includes identifying at least two sets of transitions of the inner material of the high voltage cable between at least two materials of: semiconductor breaks, insulation surface and the center connection of the high voltage cable. Further, identification of the points of interest is done by a pre-determined process and by placement of marker blocks during 3-dimensional scanning of the accessory component.

In another embodiment of the invention, positioning points are calculated by comparing and merging the center locations of the accessory component from the scan data and center of the high voltage cable end lengthwise data from prior installations.

In another embodiment of the invention, positioning points are calculated by identifying radial expansion and longitudinal contraction of the accessory component when the accessory component is slipped over the high voltage cable.

In an embodiment of the invention, positioning points are calculated by computing clearances between the accessory component material and sets of transition points of the inner material of the high voltage cable.

The term "transition points" as applied herein refers to points where there is a transition of material: from one type of material to another type of material at this point.

Further, the data obtained from the steps a. to c. can be stored for future reference and track record of the installed accessory component.

In an embodiment of the invention, data from the scans and computations is employed to monitor the changes in the distances and clearances between internal sets of transition points in the material and the accessory component as the accessory component/high voltage cable expands or deforms.

In another embodiment of the invention, additional scans may be performed for each layer of the high voltage cable to determine clearances, distances, tolerances between the transitions points of the material of high voltage cables and the accessory components as the high voltage cable expands or deforms.

In another embodiment of the invention, a method for performing quality checks on subcomponents of high voltage accessory components before positioning of the accessory components during installations is disclosed. The method comprises:
  performing 3-dimensional scans of the subcomponents of the accessory component to determine the geometry of the subcomponents before positioning of the subcomponents into final position,
  identifying deviations of the geometry of the subcomponents from pre-defined threshold values, and
  determining pass/fail condition of the subcomponents based on the identified deviations.

In another embodiment of the invention, 3-dimensional scans are performed on at least one of the parts of the subcomponent: semiconductor material, pre-molded material, insulative material before the parts are brought into a final position to form the accessory component.

In another embodiment of the invention, identifying deviations include at least one of: macro-geometric deviations, geometry of crucial interfacial regions, cuts, defects, protrusions, scratches.

In another embodiment of the invention, the scanned data may be employed for further processing and setting acceptable tolerances for different regions of the accessory component and different parts of the accessory component.

In another embodiment of the invention, a system configured to perform positioning of accessory component on a high voltage (HV) cable is provided. The system is provided with a 3-dimensional scanner to scan the geometry of the high voltage accessory component, a processor configured to employ a point data cloud (x, y, z) coordinates that converts the scanned geometry into 3-dimensional coordinates; and the processor further configured to:
  a. identify points of interest of the inner material of the high voltage cable,
  b. calculate positioning points of the accessory components on the high voltage cable by comparing with the points of interest, and
  c. position the accessory component on the high voltage cable at the calculated positioning points.

In an embodiment, the system is configured to scan the geometry of the high voltage accessory component before positioning over the cable end and/or after positioning of a cable end in its final position.

In another embodiment of the invention, the processor is configured to identify points of interest which are at least two sets of transitions of the inner material of high voltage cable between: semiconductor breaks, insulation surface and the center connection of the high voltage cable. The points of interest may be identified by pre-determined process and placement of marker blocks during 3-dimensional scanning of the accessory component.

In another embodiment of the invention, the processor calculates positioning points by merging the center locations of the accessory component from the scan data and pre-stored data from prior installations.

In another embodiment of the invention, the processor calculates positioning points by identifying radial expansion and longitudinal contraction of the accessory component when the accessory component is slipped over the high voltage cable.

In another embodiment of the invention, the processor calculates positioning points by computing clearances between the accessory component material and the sets of transition points of the inner material of the high voltage cable. Further, the data obtained from the steps a. to c. can be stored for future reference and track record of the installed accessory component.

In another embodiment of the invention, data from the scanned geometry and coordinates is employed to monitor the changes in the distances and clearances between internal sets of transition points in the material and the accessory component as the accessory component/high voltage cable expands or deforms.

In another embodiment of the invention, additional scans may be performed for each layer of the high voltage cable to determine clearances, distances, tolerances between the transitions points of the material of high voltage cables and the accessory components as the high voltage cable expands or deforms.

BRIEF DESCRIPTION OF THE DRAWINGS

The drawings herein are appended to facilitate the understanding of the invention. The drawings show embodiments of the invention and do not intend to limit the invention. The drawings will now be described by way of example only, where.

DETAILED DESCRIPTION

Figure 1:
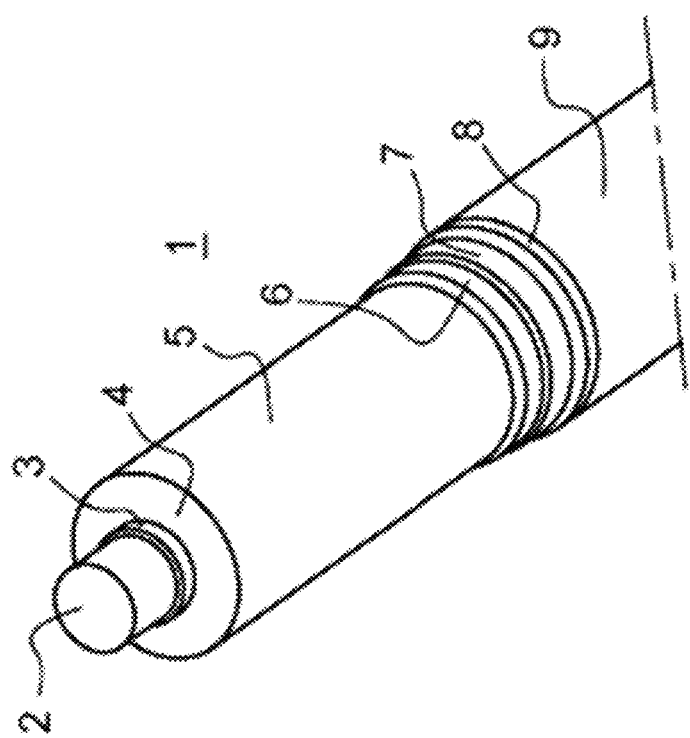
FIG. 1 (prior art) illustrates a detailed view of the high voltage cable end.

In the detailed description, different alternatives will be discussed in more detail with reference to the appended drawings. It should be understood, however, that the drawings are not intended to limit the scope of the invention to the subject-matter depicted in the drawings. The scope of the invention is defined in the appended claims.

In the exemplary embodiments, various features and details are shown in combination. The fact that several features are described with reference to a particular example should not be construed as implying that those features as a necessity have to be included together in all the embodiments of the invention. Conversely, features that are described with reference to different embodiments should not be construed as mutually exclusive. As those skilled in the art will readily understand, embodiments that incorporate any subset of features described herein and that are not expressly interdependent have been contemplated by the inventor and are part of the intended disclosure. However, explicit descriptions of all such embodiments would not contribute to the understanding of the principles of the invention, and consequently some permutations have been omitted for the sake of simplicity.

Throughout the description the term high voltage cables have been used for cables carrying voltages in the range of 1 kV and above. However, it is evident that this range also includes medium voltage levels in operation even though it is not expressed explicitly.

FIG. 1 (prior art) illustrates a detailed view of the high voltage cable end. As shown is an exemplary high voltage cable end 1. The outer sheath 9, the lead sheath 8, swelling tapes 7 and the outer semiconducting screen 6 have been removed, leaving the conductor 2, the inner semiconducting screen 3 and the insulation 4. The surface 5 of the insulation 4 is inspected to ensure that there are no irregularities, before a high voltage cable accessory component, such as high voltage joint, termination for the cable, a rubber joint, a pre-molded component, terminal housings (rains sheds etc.), insulators are slipped over it.

Figure 2:
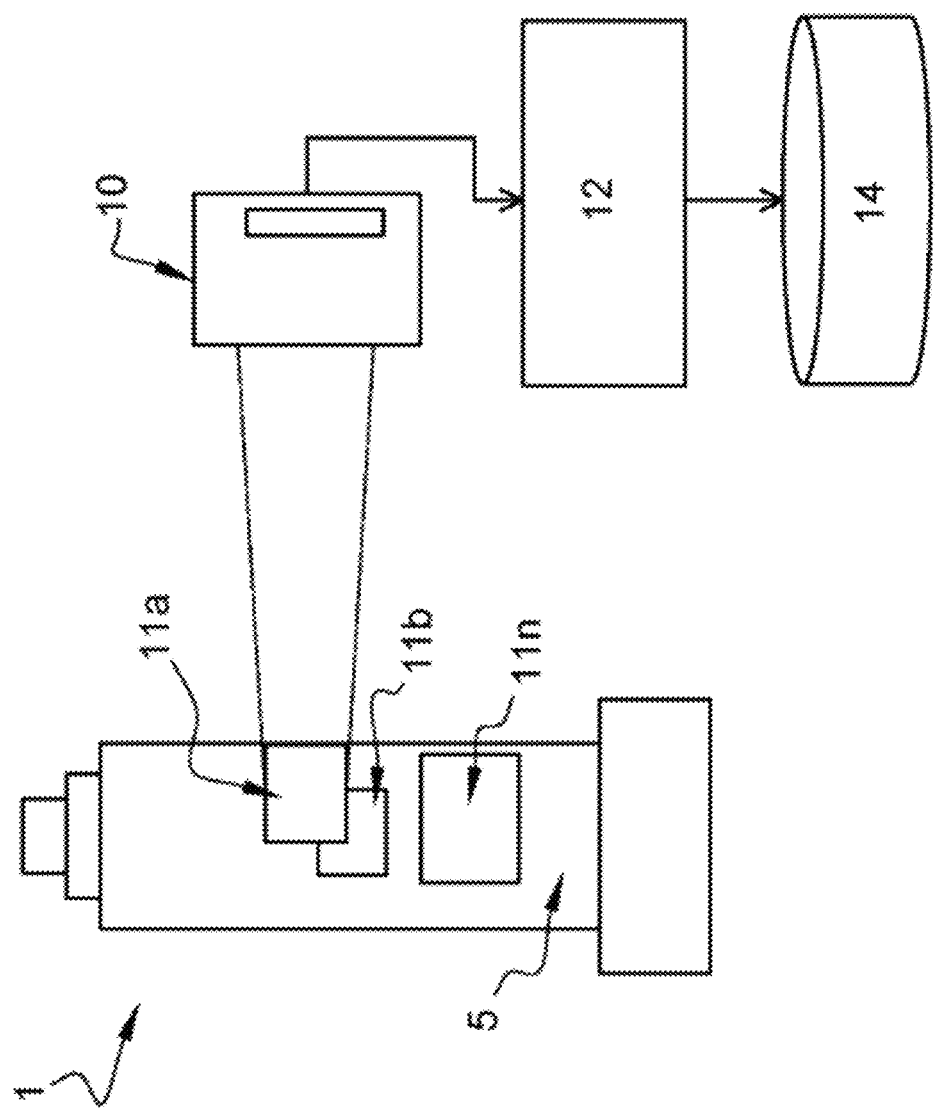
FIG. 2 illustrates a system for scanning a high voltage cable and its accessory component in accordance with the present invention.

FIG. 2 illustrates an example of a system for scanning a high voltage cable and its accessory component in accordance with the present invention. The system comprises a 3-dimensional scanner 10, which may be non-contact type of surface scanner. The 3-dimensional scanner is directed to a sub-area 11a, 11b as shown in FIG. 2 of the surface of the cable. The sub-area 11a, 11b may be defined by the field-of-view or scanning area of the non-contact surface scanner 10. In one embodiment, the non-contact surface scanner 10 may be a 3D laser scanner, a tactile probe, a rotating optical scanner, 3D probe and the like.

The sub-area 11a, 11b may be round, rectangular, linear or any other shape as determined by the scanner. The 3D scanner 10 is arranged to measure the distance to the surface 5 of the sub-area 11a, 11b. The 3D scanner 10 is movable around the cable end 1 such that the surface 5 of the cable end 1 is covered by a plurality of sub-areas 11a, 11b. The size of plurality of sub-areas 11a, 11b may vary, for example by varying the distance between the 3D scanner 10 and the cable end 1. In one embodiment the 3D scanner 10 is freely movable in any direction around the cable end 1 or the joint of the cable, such as a handheld 3D laser scanner. The non-contact surface scanner 10 knows its position and direction in 3D space by recognizing a plurality of markers (not shown) positioned on the surface 5.

Different mechanisms may be employed for positioning markers on the surface of the accessory component to be scanned. For example, 3D markers with talc spray, sticky or magnetic markers, non-contact markers wherein markers are just projected on the surface on the accessory component without their placement on the body of the component, specialized markers in 3D space, JIGs mounted with markers and similar solutions may be employed. Some of these markers and their use cases examples will be described below.

The markers may be stickers or sterile clamps with specific patterns or markers thereon. The markers will result in "NaN" (not a number=empty) areas underneath them, however, the scan can be paused, markers/clamps relocated and then the measurement can also scan the area under the markers. In an alternative, the markers can also be mechanically attached to the surface of the high voltage cable but in the region outside the region of interest for scanning, for example the markers may be placed outside the subarea of interest so that there are no physical interruptions during the scans.

In another embodiment, the non-contact surface scanner 10 may be mounted to a jig, e.g. mountable to the high voltage-cable, such that the non-contact surface scanner 10 may be moved up/down and around the surface 5 to completely fill the surface 5 with sub-areas 11a, 11b. In this solution, using markers may be avoided.

In another embodiment, various other possibility and/or methods for placing markers at different locations or around the area of interest may also be employed.

The illustrated system 1 also comprises a processor 12. The processor 12 is in communication with the 3D scanner 10 over a wired or wireless communication link. In one embodiment, at least parts of the processor 12 may be comprised in the 3D scanner 10. The processor 12 is adapted to process measurement data from the 3D scanner 10 for each of the plurality of sub-areas 11a, 11b to create a continuous 3D surface geometry measurement of the surface 5 of the cable end 1, joint of the cable and comparing the continuous 3D surface geometry measurement with at least one surface geometry acceptance threshold determining the quality of the surface 5 of the high voltage cable end 2 or the cable joint. In an example, the surface geometry acceptance threshold can be computed live on-site or by employing 3-dimensional scan data available and sent to a separate computation tool employed by the processor 12 that processes and computes the acceptance threshold data.

In one embodiment, the at least one surface geometry acceptance threshold is a go/no go test criteria. In this way, an operator may receive a go or a no go after the scan is performed, allowing or disallowing the operator to proceed to mount a high voltage cable accessory component, such as a cable joint, cable terminations, rubber molded components. The at least one surface geometry acceptance threshold may be based on at least one of a height variation threshold, a surface derivative threshold, a peeling wave threshold and/or at least one of an area of a cut, a depth of a cut, and a slope of a cut.

In one embodiment, the processor 12 is adapted to transmit the continuous 3D surface geometry measurement to a storage device 14 as a 3D topographic map of the surface 5 of the cable end 1. The processor 12 is in communication with the storage device 14 over a wired or wireless communication link. The storage device 14 may be an on-premise server or cloud server. The 3D topographic map of the surface 5 of the cable end 1 on the storage device 14 may be accessible to users and clients for future reference of the cable system.

Figure 3:
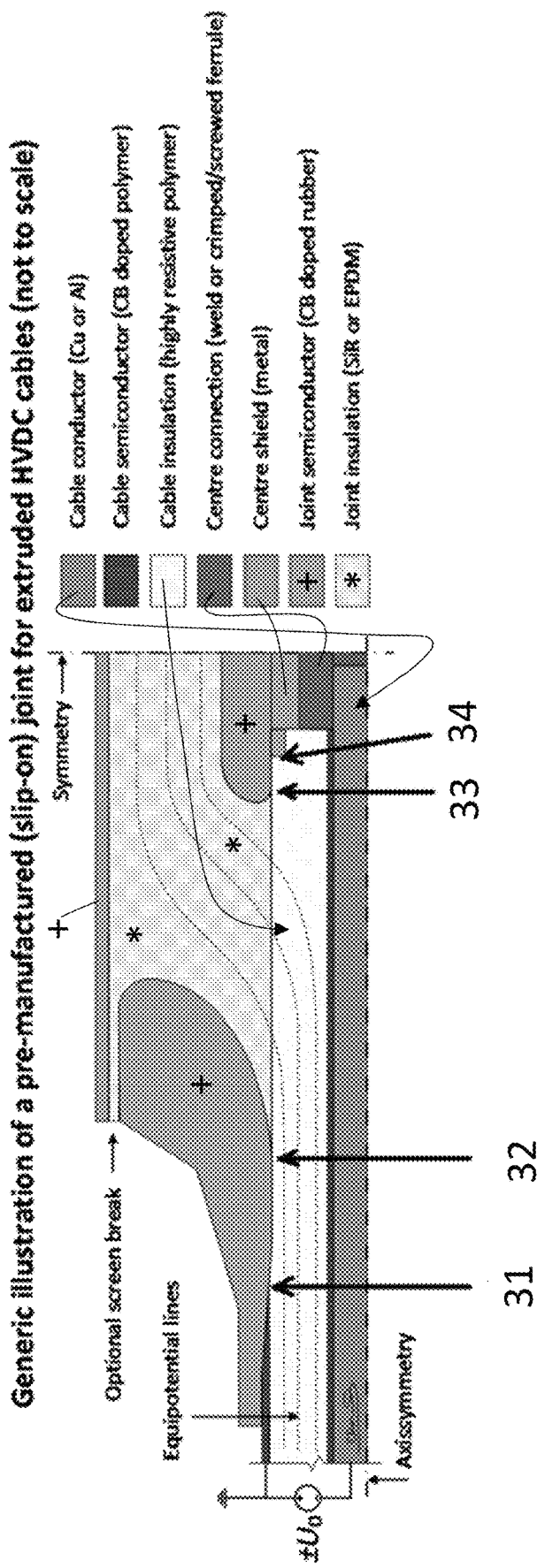
FIG. 3 illustrates high voltage joint for a high voltage cable in accordance with an embodiment of the invention.

FIG. 3 illustrates high voltage joint for a high voltage cable in accordance with an embodiment of the invention. As shown are different layers of the high voltage cable as described in FIG. 1.

In this example embodiment, the accessory component is a high voltage joint and will be described in further detail. However, this is only an example implementation of the invention and does not limit the application of the invention only to high voltage joints.

The high voltage joint for a high voltage cable, comprises center connection, center shield, cable insulation, cable semiconductor, cable conductor, joint semiconductor, joint insulation as identified by different layers in the FIG. 3. The interface between each of these layers to the other layers may be a point of interest. The point of interests is also referred to as transition points as there is a transition of material: from one type of material to another type of material at this point. The inside of the high voltage cable depicts four transition points as 31, 32, 33 and 34. There can be any number of transition points depending on the number of layers of the material. The four transition points in this example are between joint semiconductor and cable semiconductor 31, joint semiconductor and joint insulation 32, joint semiconductor and cable insulation 33 and joint semiconductor and center shield 34. In total, there may be eight such transition points for a high voltage joint with four points on each side of the high voltage joint. For a high voltage joint, point 31 and 34 must lie outside the interval spanned by point 32 and 33 on each side of the high voltage joint.

The identification of these transition points is a core aspect for determining the positioning points and positioning of the high voltage cable joint. In an embodiment, the transition points may be identified by performing inner scans or they may be known by a pre-determined process carried out prior to performing 3-dimensional scans by the scanner 10. For example, the pre-determined process may employ dimensions from the datasheet provided for high voltage cable joints, may be measured manually and input the manual data to 3D data or an algorithm.

In another embodiment, the transition points may also be measured previously by an optical scanner, conventional scanner, 3D probe or a rotational bore type scanner.

At the start, a 3D scanner for example, a 3D laser scanner may be employed to scan the exact geometry of the high voltage joint before positioning over the high voltage cable end, for example as described above with reference to FIG. 2. The accuracy of the scan may be 0.1 mm point distance and 0.025 mm accuracy however not limited to the same and may employ scanners with better accuracy known in the field. Further, scans may be performed on high voltage ends and center connection to the high voltage cable, and in addition the high voltage cable joint is scanned before it is placed in the final position.

In an embodiment, several additional scans may also be performed on high voltage accessory components such as high voltage joints or terminations when they are fit into their final position. In addition, scans may also be performed on additional layers such as tapes, sheaths etc. when these materials are added over earlier scanned assemblies.

The scanned data is then fed to point data cloud. The point data cloud represents set of data points in 3D space that correspond to the 3D shape of the surface/accessory component on which the scan was performed. The point data cloud then converts the identified points from the scan data to coordinates in 3-dimensions of (x, y, z).

The data from the scans and the point data cloud is then sent to a processor 12 (shown in FIG. 2) to be processed. The processor 12 merges the data from the point data cloud and the coordinates identified or converted with the real time geometries of the high voltage joint and cable to determine several aspects such as, positioning of the center location of the accessory component and the center of the high voltage cable end lengthwise. The processor 12 compares the data from the scans with the data from pre-stored images within the processor, data from the manufacturer's end, data sheets of the components and the like to determine deviations in the scan data from the data to be needed for accurate installation. The processor 12 also identifies radial expansion and longitudinal contraction of the high voltage cable joint when the joint is slipped over the high voltage cable. Based on the comparison performed by the processor 12, the positioning points are calculated by the processor 12 by computing clearances between the high voltage cable joint and the sets of the transition points identified on the inner material of the high voltage cable.

The data processed by the processor 12 may be stored in a storage device 14 and is employed for future reference and track record of the installed high voltage cable joints at a later stage for example, after several years of installations when repairs are to be performed on the high voltage joints.

Figure 4:
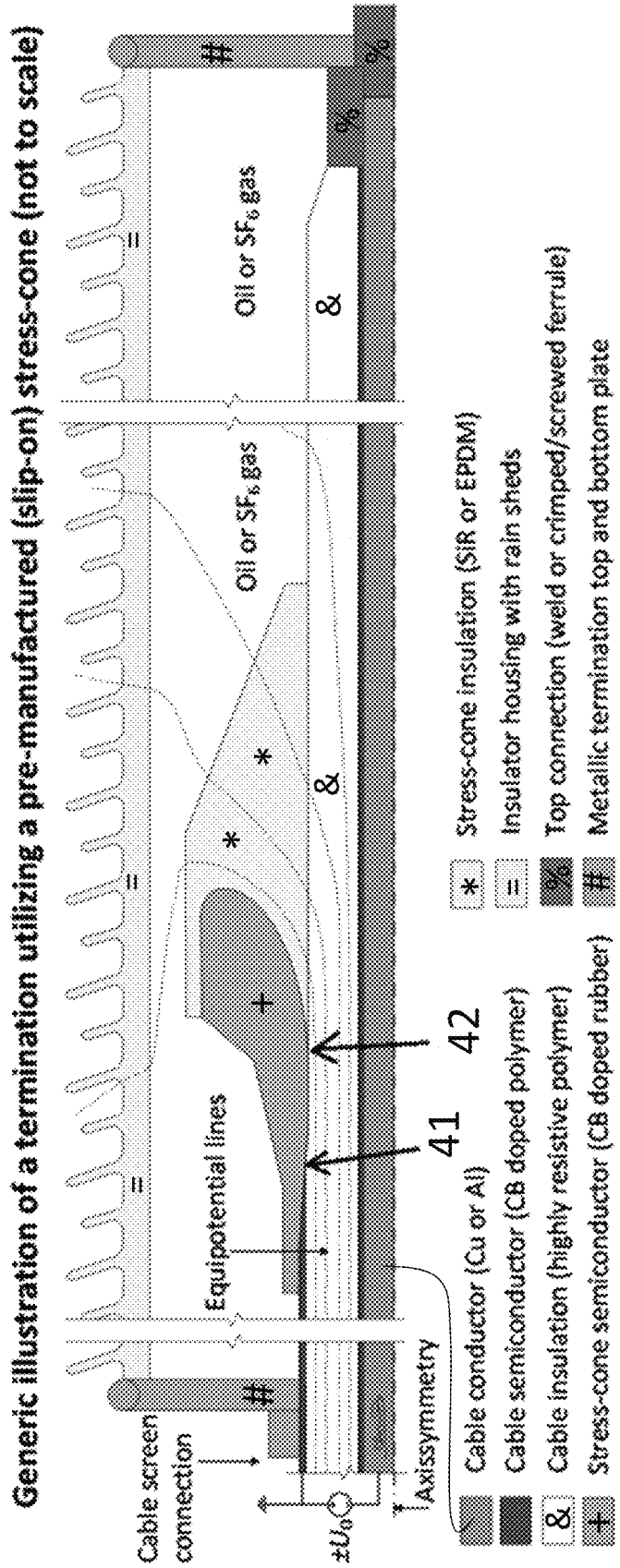
FIG. 4 illustrates a termination of the high voltage cable in accordance with an embodiment of the invention.

FIG. 4 illustrates a termination of the high voltage cable in accordance with an embodiment of the invention. In FIG. 4, the high voltage accessory component is shown as high voltage cable termination and will be explained in detail with reference to attachment of the subcomponents of the accessory component and performing quality checks for the subcomponents. However, the example implementation does not intend to limit the scope to a high voltage cable termination.

The high voltage cable termination utilizes a pre-manufactured stress cone as depicted herein. The different layers of the high voltage cable termination as illustrated in FIG. 4 show transition points 41 and 42 that lie at the transitions of the cable semiconductor and stress-cone semiconductor 41 and stress-cone insulation and the cable insulation 42. For the stress-cone in a high voltage cable termination, point 41 must be below point 42, while the bottom of the stress cone must overlap point 41.

A 3D scan is performed by employing a 3D laser scanner to determine the exact geometry of the high voltage cable termination before and/or after positioning of the stress-cone on the termination. The accuracy of the scan may be 0.1 mm point distance with 0.025 mm accuracy however not limited to the same. For example, scans may be performed on cable terminations and center connection and stress-cone connection points. In an embodiment, several additional scans may also be performed on each layer of the cable termination.

In an embodiment, the 3D laser scanning may be performed on separate parts or layers of the accessory component. The layers or separate parts may be hereafter referred to as subcomponents of the accessory component. In such a case, separate scans may be performed individually for subcomponents of the accessory component such as semiconductor material, pre-molded material and insulative material and the parts that are being brought into the final position of the high voltage cable accessory component. The scan allows to screen and identify any defects or deviations of the subcomponent parts, screen for scratches, protrusions, and overall macro-geometric shape of each part, geometry of crucial interfacial regions, cuts, defects, scratches and the like. Further, data from the defects and deviations is compared with pre-defined threshold values. The pre-defined threshold values may be stored in the processor 12 previously based on data from previous installations, manufacturers data sheets and tolerance information, allowable thresholds defined for the subcomponent of the accessory component to pass a quality check and so on. Based on the results from the comparison, the subcomponent may be approved for quality checks with pass/fail condition depending on if the deviations are within allowable tolerances. This information may be indicated to the operator in the form of go/no go criterion. If the subcomponent gets a go criterion means it passed the quality check and may be employed for the accessory component. On the other hand, if the subcomponent gets a no-go criterion means it failed the quality check and may not be employed for the accessory component. In case of failed quality checks, the subcomponent may be replaced by a new subcomponent, or scrapped all together and the quality check process may be repeated. In some cases, the detected defects can be fixed for example, by sanding and other methods used commonly.

In another embodiment, the process for performing scans and checking for quality of the subcomponents of the accessory component may be automated and the processor 12 may be configured with instructions to carry out the entire quality check process automatically.

In this manner, control quality of the subcomponents and accessory components in total may be performed before the accessory components are placed on the high voltage cable.

Thereafter, another scan may be performed on the final positioned finished molded subcomponents to determine deviations, defects, tolerances on the final position/molded parts together on the high voltage cable.

The data from both the scans is then fed to point data cloud. The point data cloud represents set of data points in 3D space that correspond to the 3D shape of the surface/accessory component on which the scan was performed. The point data cloud may employ different techniques such as polygon mesh, triangle mesh and so on to convert point cloud obtained from the scans to a 3D coordinates in space (x, y, z).

The data from the scans and the point data cloud is then sent to a processor 12 to be processed. The processor 12 merges the data from the point data cloud and the coordinates identified or converted with the real time geometries of the high voltage cable terminations.

The processor 12 may also employ an algorithm dedicated to the individual accessory subcomponent part itself, which allows for setting up different defect tolerances in different regions, and tolerances on every 3D geometric feature of the part. In an example, acceptable tolerances for different regions and parts of the subcomponents, tolerances on every 3D geometric feature of the subcomponent may be pre-defined for the accessory components for installation.

The algorithm may also merge the individual scan files of the constituting parts and the final part to make a full 3D map of the component.

The processor 12 then compares the data from the scans with pre-stored data on the accessory components and computes several aspects such as, positioning of the center location of the termination and the center of the stress-cone. The processor 12 then identifies the radial expansion and longitudinal contraction of the high voltage termination when the termination is slipped over the high voltage cable and the stress-cone. The processor 12 also identifies radial expansion and longitudinal contraction of the high voltage cable termination. The expansions, contractions can also be employed as a measure of the quality check to check if the expansions and contractions are within acceptable limits.

The positioning points are calculated by the processor 12 by computing clearances between the high voltage cable terminations and the sets of the transition points identified on the inner material of the high voltage cable terminations and stress-cones.

The data processed by the processor 12 is then stored in a storage device 14 and is employed for future reference and track record of the installed high voltage cable joints at a later stage for example, after several years of installations when repairs are to be performed on the high voltage termination or joints.

In an embodiment, placing the accessory component is dependent on the skilled operators in the field who have a deep understanding of the dimensional tolerances, clearances etc. they will have to work with.

Figure 5:
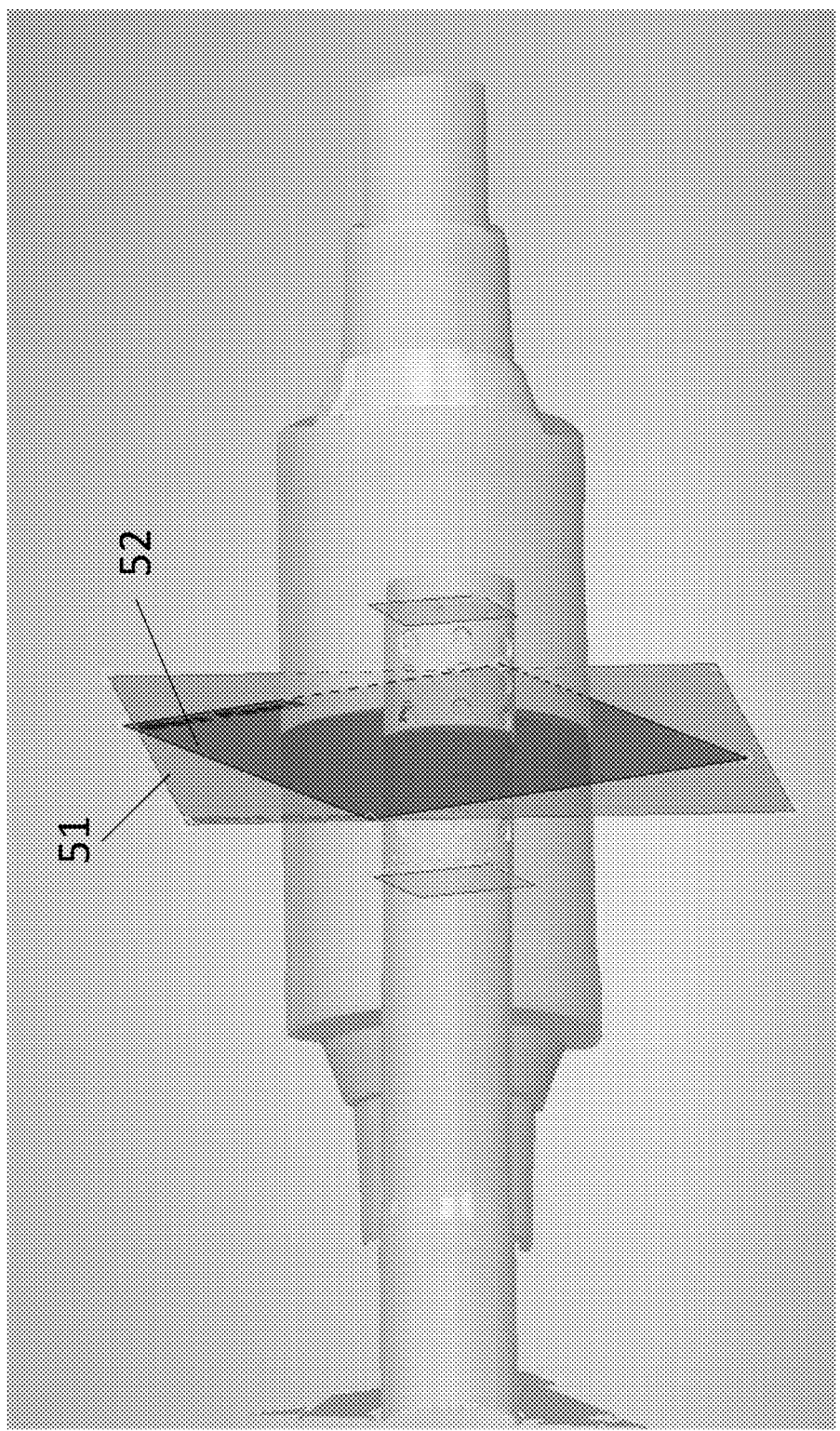
FIG. 5 illustrates placement of the high voltage joint position during computations in accordance with the invention.

FIG. 5 illustrates placement of the high voltage joint position during computations in accordance with the invention. An example embodiment as depicted in FIG. 5 employs software for comparison and verification of the accessory positioning for example, a high voltage joint positioning from the data obtained from the scans of the geometry and computations performed by the processor 12. The positioning points are further calculated by comparing and merging the center locations (51, 52 as shown in FIG. 5) of the accessory component from the scan data and center of the high voltage cable end lengthwise data from prior installations. In an example, the data from prior installations may be pre-stored in the processor and used subsequently as a standard for comparison with the data from the scans. After calculating the positioning points, the high voltage joint may then be placed accurately in the position by adjusting the centers planes of the high voltage cable assembly and joint body placed over the cable assembly so that they are aligned together. In addition, their positioning may be further verified by an additional scan and comparing this additional scan data with the pre-stored data on installation. In case of any deviations, the positioning points may be recalculated by scans and adjustments performed in the deviations/variations on the data. The data from the scans also give an indication of the volume of the joint. All this data is further fed to the processor 12, that computes the accurate positioning points for the joints or any other accessory components.

The simulations from the figure show the lengthwise positioning between computed center location of the accessory component and center connection/cable ends in the data. This data also gives an indication on the how the distances between the internal material transition points may stretch or vary as the accessory component is pulled over.

In another embodiment, an alternate may be to employ the data and compute mean radius to determine alignment and positioning of the high voltage joint.

In an alternative embodiment, the processor 12 may be configured with an algorithm that employs the data from the scans and computes clearances between transition regions for example, regions 31, 32, 33, 34 as described in FIG. 3 for a high voltage joint and the variation around the high voltage cable.

Figure 6:
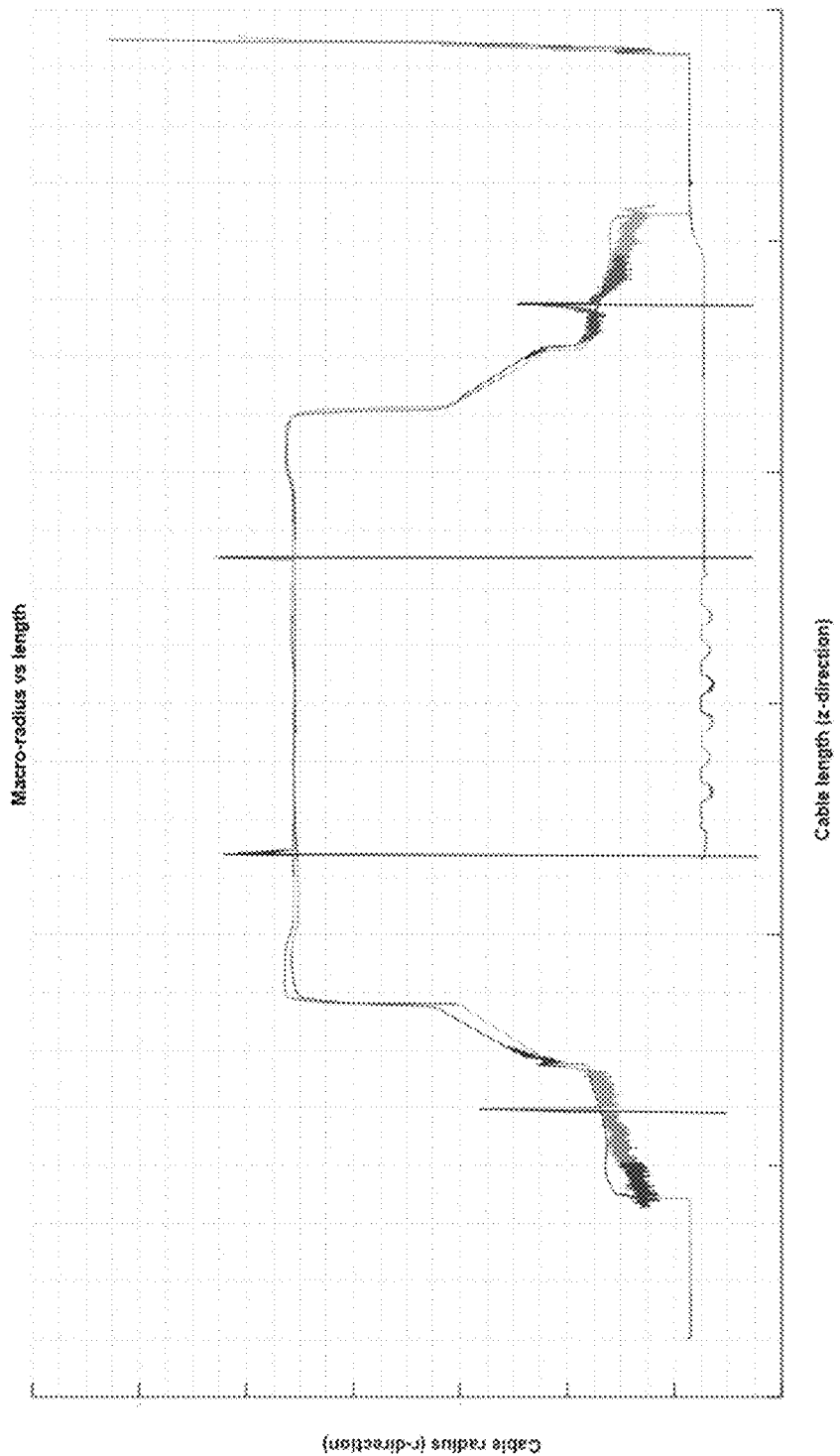
FIG. 6 illustrates computed longitudinal positioning of a high voltage joint including reference markers on inner material transition points in accordance with the invention.

FIG. 6 illustrates computed longitudinal positioning of a high voltage joint including reference markers on inner material transition points in accordance with the invention. After post processing data obtained from a high voltage joint a plot of the data for the cable length vs cable radius is as shown. The figure also shows the transition points for the material of the high voltage joint and their alignment and positioning.

In other embodiments, some accessory components or the subcomponents may include curved surfaces, in such a case it may be essential to perform scans on the inner and the outer surface of the accessory components separately in order to ensure external and internal interface geometries of the components are covered. For example, to begin with a scan may be performed on the inner surfaces by rotating the accessory component and ensuring the entire surface inside is scanned and covered by the scanner 10. The process may pose some challenges as it may be necessary to ensure the inner surfaces are scanned well. In an example, to facilitate better coverage of scans over curved and smooth surfaces talc spray and 3D markers may be employed inside the surface to be scanned. The data from the scans of the inside surface is then gathered.

In the second step, a scan may be performed on the outer surface of the accessory component. During this procedure, similar to the scan of the inner surface, the accessory component may be rotated and adjusted to ensure the entire outer surface is covered by the scan. Talc spray and 3D markers may be employed to minimize the effects of glare and to obtain accurate scan data.

The scanned data from both the inner surface and outer surface is then fed to point data cloud of (x, y, z) which then converts the identified points from the scan data to coordinates in 3-dimensions. The data from the scans and the point data cloud is then sent to a processor 12 (shown in FIG. 2) to be processed. The processor 12 merges the data from the point data cloud and the coordinates identified or converted with the real time geometries of the accessory components to compute several aspects for quality control and quality checks of the components or subcomponents. The processor 12 may be configured with an algorithm to check and compare for deviations, tolerances, positioning of different subcomponents of the accessory component from the obtained scan data with pre-stored data on the accessory component. The pre-stored data may be configured into the processor 12 beforehand based on the information from the datasheets, manufacturer's information of accessory components, installation, and positioning procedures and so on. The processor 12 may also output the results from the comparison regarding defects, deviations, irregularities such as go/no go criterion to an operator who performs installation. Based, on the output information or an inspection report generated the user may perform adjustments to account for accurate quality control and quality checks on the accessory components employed in high voltage cables.

In an embodiment, a post-installation scan may also be performed on the accessory component (insulator in this example case) to determine if the positioning of the accessory component has been done accurately. The data from post-installation scan may be converted to 3D coordinates and then processed by the processor 12. The processor 12 compares the data to determine if parameters such as deviations in positioning of the components, their dimensions and tolerances are within the acceptable ranges which is pre-configured. If the parameters are within acceptable range the installation is successful. On the other hand, if the deviations in parameters are not within the acceptable range the operator may be given an indication to perform additional checks and adjustments either manually or by an automated process.

The data processed by the processor 12 is then stored in a storage device 14 and is employed for future reference and track record of the installed high voltage insulators at a later stage for example, after several years of installations when repairs are to be performed.

In an embodiment, several additional scans may be performed at each stage of the installation process for example, during positioning of subcomponents of the accessory components, their positioning in final molds, during positioning of the accessory components itself and a final scan after the positioning of the accessory components. The data from all these additional scans may be stored in the system and may be utilized at a later stage during the lifetime of the accessory component in use. The data from the scans may include unique features of the geometry of the components which may be unique for every component scanned. The data may be utilized at a later point, for example, if there are repairs to be performed on the accessory component after several years. The uniqueness of the scanned data can also be employed to create simulations and conduct study on different the components and their use cases.

The invention claimed is:

1. A method for positioning of an accessory component on high voltage cable during installations, said method comprising the steps of:
  determining the geometry of the high voltage accessory component by employing a 3-dimensional scanner;
  employing a point data cloud coordinates that converts the scanned data geometry into 3-dimensional coordinates; and
  processing the obtained coordinates by a processor to perform the steps of:

a. identifying points of interest of the inner material of the high voltage cable;
b. calculating positioning points of the accessory component on the high voltage cable by comparing with the points of interest; and
c. positioning the accessory component on the high voltage cable at the calculated positioning points.

2. The method as in claim 1, wherein the geometry of the high voltage accessory component is determined by scanning before positioning over the cable and/or after positioning of a cable end in its final position.

3. The method as in claim 1, wherein identifying points of interest includes identifying at least two sets of transitions of the inner material of the high voltage cable between at least two materials of: semiconductor breaks, insulation surface and the center connection of the high voltage cable.

4. The method as in claim 3, wherein identification of the points of interest is done by pre-determined process and placement of marker blocks during 3-dimensional scanning of the accessory component.

5. The method of claim 1, wherein the method further performs storing the data obtained from the steps a. to c. for future reference, track record and performing simulations of the installed accessory component.

6. The method as in claim 1, wherein the data from the scans and computations is employed to monitor the changes in the distances and clearances between internal sets of transition points in the material and the accessory component as the accessory component/high voltage cable expands or deforms.

7. The method as in claim 1, wherein the method comprises the steps of performing additional scans for each layer of the high voltage cable and/or the accessory component to determine clearances, distances, tolerances between the transition points of the material of high voltage cables and the accessory components as the high voltage cable expands or deforms.

8. A system configured to perform positioning of accessory component on a high voltage (HV) cable, the system comprising:
a 3-dimensional scanner to scan the geometry of the high voltage accessory component;
a processor configured to employ a point data cloud coordinates that converts the scanned geometry into 3-dimensional coordinates;
said processor further configured to:
a. identify points of interest of the inner material of the high voltage cable;
b. calculate positioning points of the accessory components on the high voltage cable by comparing with the points of interest; and
c. position the accessory component on the high voltage cable at the calculated positioning points.

9. The system as in claim 8, wherein the system is configured to scan the geometry of the high voltage accessory component before positioning over the cable end and/or after positioning of a cable end in its final position.

10. The system as in claim 8, wherein the processor is configured to identify points of interest which are at least two sets of transitions of the inner material of high voltage cable between: semiconductor breaks, insulation surface and the center connection of the high voltage cable.

11. The system as in claim 8, wherein the processor is configured to identify the points of interest by pre-determined process and placement of marker blocks during 3-dimensional scanning of the accessory component.

12. The system of claim 8, wherein the processor is configured to store the data obtained from the steps a. to c. for future reference, track record and performing simulations of the installed accessory component.

13. The system as in claim 8, wherein the processor is configured to employ data from the scanned geometry and 3-dimensional coordinates to monitor the changes in the distances and clearances between internal sets of transition points in the material and the accessory component as the accessory component/high voltage cable expands or deforms.

14. The system as in claim 8, wherein the system is further configured to perform additional scans for each layer of the high voltage cable and/or the accessory component to determine clearances, distances, tolerances between the transitions points of the material of high voltage cables and the accessory components as the high voltage cable expands or deforms.

* * * * *